United States Patent
Choi et al.

(10) Patent No.: US 9,129,174 B2
(45) Date of Patent: Sep. 8, 2015

(54) MOBILE COMPUTING UNIT FOR REDUCING USAGE FATIGUE

(71) Applicant: Symbol Technologies, Inc., Schaumburg, IL (US)

(72) Inventors: Jaeho Choi, Whitestone, NY (US); Ian R. Jenkins, Stony Brook, NY (US); Richard M. Martin, New Hyde Park, NY (US); Chandra M. Nair, Mount Sinai, NY (US); Konstantinos D. Tsiopanos, Selden, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 204 days.

(21) Appl. No.: 13/721,241

(22) Filed: Dec. 20, 2012

(65) Prior Publication Data

US 2014/0014727 A1  Jan. 16, 2014

Related U.S. Application Data (60) Provisional application No. 61/741,163, filed on Jul. 13, 2012.

(51) Int. Cl.
*G06K 7/10* (2006.01)
*G06K 7/00* (2006.01)
(Continued)

(52) U.S. Cl.
CPC ............ *G06K 7/1091* (2013.01); *G06F 1/1632* (2013.01); *G06K 7/0004* (2013.01); *G06K 7/01* (2013.01); *G06K 7/015* (2013.01); *G06K 7/10* (2013.01); *G06K 7/10009* (2013.01); *G06K 7/10386* (2013.01); *G06K 7/10554* (2013.01); *G06K 7/10881* (2013.01); *G06K 7/14* (2013.01);
(Continued)

(58) Field of Classification Search
USPC ........................................................ 235/470
See application file for complete search history.

(56) References Cited

U.S. PATENT DOCUMENTS

| 4,097,133 A | 6/1978 | Stemme |
| 4,282,425 A | 8/1981 | Chadima et al. |

(Continued)

FOREIGN PATENT DOCUMENTS

| EP | 1225501 A2 | 7/2002 |
| GB | 2299394 A | 10/1996 |

(Continued)

OTHER PUBLICATIONS

Non Final Office Action mailed Aug. 22, 2013 in U.S. Appl. No. 13/685,750, Richard M Martin, filed Nov. 22, 2012.

(Continued)

*Primary Examiner* — Michael G Lee
*Assistant Examiner* — David Tardif (57) ABSTRACT

A mobile unit (MU) is described. The MU includes a handle configured for gripping the MU with fingers of one hand of a user's arm. The MU includes a trigger switch positioned on the handle and configured to activate a data capture function of the MU when the trigger switch is depressed. The MU includes a display device positioned above the handle of the MU such that the display device is viewable to the user when the fingers grip the handle of the MU and the user's arm is maximally extended. The MU includes a data acquisition device located on an opposite side of the display device so as to capture data from an object positioned in a field of view of the data acquisition device when the trigger switch is depressed.

20 Claims, 5 Drawing Sheets

(51) Int. Cl.
*G06K 7/01* (2006.01)
*G06K 7/015* (2006.01)
*G06K 7/14* (2006.01)
*H04M 1/11* (2006.01)
*G06F 1/16* (2006.01)
*G06K 9/22* (2006.01)

(52) U.S. Cl.
CPC ............... *G06K 9/228* (2013.01); *H04M 1/11* (2013.01); *Y10T 29/49117* (2015.01)

(56) References Cited

U.S. PATENT DOCUMENTS

| | | | |
|---|---|---|---|
| 5,035,181 A | 7/1991 | Jacks et al. | |
| 5,204,531 A | 4/1993 | Elings et al. | |
| 5,250,790 A | 10/1993 | Melitsky et al. | |
| 5,340,972 A | 8/1994 | Sandor | |
| 5,349,497 A | 9/1994 | Hanson et al. | |
| 5,382,784 A | 1/1995 | Eberhardt | |
| 5,477,044 A | 12/1995 | Aragon | |
| 5,496,992 A * | 3/1996 | Madan et al. | 235/472.02 |
| 5,736,726 A | 4/1998 | Van Horn et al. | |
| 5,770,848 A | 6/1998 | Oizumi et al. | |
| 5,801,918 A | 9/1998 | Ahearn et al. | |
| 5,828,052 A | 10/1998 | Reynolds et al. | |
| 5,837,990 A | 11/1998 | Shepard | |
| 5,905,248 A | 5/1999 | Russell et al. | |
| 5,970,184 A | 10/1999 | Katoh et al. | |
| 6,056,199 A | 5/2000 | Wiklof et al. | |
| 6,085,981 A | 7/2000 | Knowles et al. | |
| 6,115,025 A | 9/2000 | Buxton et al. | |
| 6,184,654 B1 | 2/2001 | Bachner et al. | |
| 6,223,987 B1 | 5/2001 | Knowles et al. | |
| 6,286,760 B1 | 9/2001 | Schmidt et al. | |
| 6,421,234 B1 | 7/2002 | Ricks et al. | |
| 6,502,754 B1 | 1/2003 | Bhatia | |
| 6,518,952 B1 | 2/2003 | Leiper | |
| 6,575,369 B1 | 6/2003 | Knowles et al. | |
| 6,607,134 B1 | 8/2003 | Bard et al. | |
| 6,648,229 B1 | 11/2003 | Knowles et al. | |
| 6,726,070 B2 | 4/2004 | Lautner | |
| 6,754,069 B2 | 6/2004 | Harada | |
| 6,844,869 B1 | 1/2005 | Kukita | |
| 6,853,293 B2 | 2/2005 | Swartz et al. | |
| 7,065,299 B2 | 6/2006 | Schluter et al. | |
| 7,147,162 B2 | 12/2006 | Fitch et al. | |
| 7,157,705 B2 | 1/2007 | Hamrelius | |
| 7,191,947 B2 | 3/2007 | Kahn et al. | |
| D540,838 S | 4/2007 | Aronsson | |
| 7,250,603 B1 | 7/2007 | Nugent | |
| 7,389,933 B2 | 6/2008 | Wang | |
| D583,263 S | 12/2008 | Sebban | |
| 7,490,776 B2 | 2/2009 | Thuries | |
| 7,562,824 B2 | 7/2009 | Bhatia et al. | |
| 7,566,009 B2 | 7/2009 | Lapstun et al. | |
| 7,609,406 B2 * | 10/2009 | Roth et al. | 358/1.15 |
| 7,746,511 B2 | 6/2010 | Hamilton et al. | |
| 7,748,632 B2 | 7/2010 | Coleman et al. | |
| 7,764,488 B2 | 7/2010 | Calvarese | |
| 7,867,019 B1 | 1/2011 | Loukusa | |
| 7,886,377 B2 | 2/2011 | Hamberg et al. | |
| D658,222 S | 4/2012 | Elrod | |
| D665,440 S | 8/2012 | Sigward | |
| 8,255,836 B1 | 8/2012 | Gildfind | |
| D668,561 S | 10/2012 | Dunkin et al. | |
| 8,825,516 B2 * | 9/2014 | Grant et al. | 705/7.41 |
| 2002/0099894 A1 | 7/2002 | Kehoe et al. | |
| 2002/0140668 A1 | 10/2002 | Crawford | |
| 2002/0165436 A1 | 11/2002 | Schluter et al. | |
| 2003/0179178 A1 | 9/2003 | Zargham | |
| 2004/0129903 A1 | 7/2004 | Diamantstein et al. | |
| 2005/0001036 A1 | 1/2005 | Blake et al. | |
| 2005/0117624 A1 | 6/2005 | Hollander et al. | |
| 2006/0105722 A1 | 5/2006 | Kumar | |
| 2006/0138232 A1 | 6/2006 | Hammerslag et al. | |
| 2006/0197753 A1 | 9/2006 | Hotelling | |
| 2006/0221363 A1 | 10/2006 | Roth et al. | |
| 2006/0229034 A1 | 10/2006 | Gizia et al. | |
| 2007/0067745 A1 | 3/2007 | Choi et al. | |
| 2007/0131774 A1 * | 6/2007 | Celestini | 235/462.45 |
| 2008/0078839 A1 | 4/2008 | Barkan | |
| 2008/0105747 A1 * | 5/2008 | Orlassino | 235/462.41 |
| 2008/0116093 A1 | 5/2008 | Felten et al. | |
| 2008/0116271 A1 | 5/2008 | Holz et al. | |
| 2008/0128492 A1 | 6/2008 | Roth et al. | |
| 2008/0128499 A1 | 6/2008 | Chen et al. | |
| 2008/0128512 A1 | 6/2008 | Schmidt et al. | |
| 2008/0163504 A1 * | 7/2008 | Smith et al. | 33/268 |
| 2009/0033633 A1 | 2/2009 | Newman | |
| 2009/0039162 A1 | 2/2009 | Yen | |
| 2009/0102925 A1 | 4/2009 | Sheard | |
| 2009/0108076 A1 | 4/2009 | Barkan et al. | |
| 2009/0116018 A1 | 5/2009 | Austin et al. | |
| 2009/0172591 A1 | 7/2009 | Pomper | |
| 2009/0224039 A1 | 9/2009 | Hause et al. | |
| 2009/0257469 A1 | 10/2009 | Jones et al. | |
| 2009/0266899 A1 | 10/2009 | Yoshizawa | |
| 2009/0289116 A1 | 11/2009 | Copeland et al. | |
| 2009/0307634 A1 | 12/2009 | Strandall | |
| 2010/0026498 A1 | 2/2010 | Bellows et al. | |
| 2010/0037184 A1 | 2/2010 | Sie | |
| 2010/0046577 A1 | 2/2010 | Sheard | |
| 2010/0096461 A1 | 4/2010 | Kotlarsky et al. | |
| 2010/0148066 A1 | 6/2010 | Stratmann et al. | |
| 2010/0171021 A1 | 7/2010 | Smith | |
| 2010/0277506 A1 | 11/2010 | Yao | |
| 2011/0075339 A1 | 3/2011 | Lam | |
| 2011/0121075 A1 | 5/2011 | Bellows et al. | |
| 2011/0164056 A1 | 7/2011 | Ording et al. | |
| 2011/0180600 A1 * | 7/2011 | Wang et al. | 235/383 |
| 2011/0246336 A1 | 10/2011 | Callaghan | |
| 2011/0290886 A1 | 12/2011 | Carlson | |
| 2011/0290889 A1 * | 12/2011 | Tamburrini et al. | 235/470 |
| 2012/0314083 A1 | 12/2012 | Ratliff et al. | |
| 2014/0014725 A1 | 1/2014 | Martin et al. | |
| 2014/0014726 A1 | 1/2014 | Tsiopanos et al. | |
| 2014/0014727 A1 | 1/2014 | Choi et al. | |

FOREIGN PATENT DOCUMENTS

| | | |
|---|---|---|
| GB | 2358336 | 7/2001 |
| GB | 2396728 A | 6/2004 |
| WO | 9314472 A1 | 7/1993 |
| WO | 2004066615 A1 | 8/2004 |
| WO | 2007061498 A2 | 5/2007 |

OTHER PUBLICATIONS

Leenes R., et al., "PRIME white paper," EU Project Prime, Privacy and Identity Management for Europe, Third and Final Version, May 15, 2008, 22 pages.

* cited by examiner

MOBILE COMPUTING UNIT FOR REDUCING USAGE FATIGUE

CROSS-REFERENCE TO RELATED APPLICATIONS

This application claims priority to U.S. Provisional Patent Application Ser. No. 61/741,163 filed Jul. 13, 2012, entitled, "MOBILE COMPUTING DEVICE INCLUDING AN ERGONOMIC HANDLE," the contents of which are expressly incorporated herein by reference in their entirety.

TECHNICAL FIELD

The invention relates to a mobile computing unit including ergonomic features to reduce fatigue from performing repeated scanning procedures as well as to increase an efficiency of performing the repeated scanning procedures.

BACKGROUND

A conventional mobile unit (MU) can be configured with a data acquisition device (DAD) to activate a data capture function, such as a scanning function. For example, the DAD can include a barcode scanner and the data capture function can include barcode scanning. In another example, the DAD can include an imager or camera and the data capture function can include capturing an image.

The conventional MU can be used in a variety of environments, such as in a warehouse or stock room in which multiple scanning procedures are performed. For example, the scanning procedure can be repeated for each object for which data is to be captured. A conventional MU is designed such that the user can grip a pistol grip handle of a housing of the MU and manually orient the DAD in a manner such that the data capture procedure can be performed. The components of the conventional MU are typically arranged such that the DAD is oriented parallel to the display so as to simplify the design and fabrication of the MU. However, such a design can lead to significant user fatigue upon the user performing repeated data capture procedures.

SUMMARY

In one aspect, the invention is embodied in a mobile unit (MU). The mobile unit can include a handle configured for gripping the MU with fingers of one hand of a user's arm. A trigger switch is positioned on the handle and configured to activate a data capture function of the MU when the trigger switch is depressed. A display device is positioned above the handle of the MU such that the display device is viewable to the user when the fingers grip the handle of the MU and the user's arm is maximally extended. A data acquisition device is located on an opposite side of the display device so as to capture data from an object positioned in a field of view of the data acquisition device when the trigger switch is depressed.

In one embodiment, the data acquisition device includes an imaging device. The display device can be configured to display images from the imaging device. The data acquisition device can include a laser scanning device. The data acquisition device can include a radio-frequency identification (RFID) module.

In one embodiment, a camera can be positioned adjacent to the data acquisition device such that a field of view of the camera at least partially overlaps the field of view of the data acquisition device. The display device can be a touch screen display.

The trigger switch can be accessible to an index finger of the hand of the user when the handle is held in the hand of the user. A battery can be positioned in a recess of the handle. The mobile unit can also include a rotary control switch for controlling a function of the mobile unit.

In another aspect, the invention is embodied in a housing of a mobile unit (MU). The housing includes a handle configured for gripping the mobile unit with fingers of one hand of a user's arm. A trigger switch is positioned on the handle and configured to activate a data capture function of the mobile unit when the trigger switch is depressed. The housing also includes a top portion coupled to the handle for housing a display device and a data acquisition device. The display device is disposed above the handle of the mobile unit such that the display device is viewable to the user when the fingers grip the handle of the mobile unit and the user's arm is maximally extended. The data acquisition device is disposed on an opposite side of the display device so as to capture data from an object positioned in a field of view of the data acquisition device when the trigger switch is depressed.

In one embodiment, a longitudinal axis of the handle is substantially parallel to a plane of the display device. The longitudinal axis of the handle can be non-perpendicular to a central axis of a field of view of the data acquisition device. In one embodiment, a central axis of the field of view can be substantially parallel to a longitudinal axis of the maximally extended arm of the user.

The top portion of the housing can also include a proximity sensor for sensing proximity of an object relative to the housing. The top portion can also include a motion sensor for sensing a motion of the housing. The top portion can also include a light source configured to generate illumination on the object. In one embodiment, the top portion at least partially houses a camera positioned adjacent the data acquisition device such that a field of view of the camera at least partially overlaps the field of view of the data capture device. The top portion can also house a rotary control switch for controlling a function of the mobile unit.

In another aspect, the invention is embodied in a mobile unit (MU). The MU includes a housing having a handle for gripping the mobile unit with fingers of one hand of a user's arm. A trigger switch is positioned on the handle for activating a data capture function of the mobile unit when the trigger switch is depressed. The trigger switch is accessible to an index finger of the hand of the user when the handle is held in the hand of the user. A display device is disposed at least partially within the housing and above the handle of the mobile unit such that the display device is viewable to the user when the fingers grip the handle of the device and the user's arm is maximally extended. An imaging device is coupled to the housing and located on an opposite side of the display device so as to capture data from an object positioned in a field of view of the imaging device when the trigger switch is depressed. A camera is coupled to the housing and located adjacent to the imaging device such that a field of view of the camera at least partially overlaps the field of view of the imaging device.

BRIEF DESCRIPTION OF THE FIGURES

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

The above and further advantages of this invention may be better understood by referring to the following description in conjunction with the accompanying drawings, in which like numerals indicate like structural elements and features in various figures. Skilled artisans will appreciate that reference designators shown herein indicate components shown in a figure other than the one in discussion. For example, talking about a device 10 while discussing Figure A would refer to an element, 10, shown in figure other than Figure A.

DETAILED DESCRIPTION

The following detailed description is merely illustrative in nature and is not intended to limit the invention or the application and uses of the invention. Furthermore, there is no intention to be bound by any express or implied theory presented in the preceding technical field, background, brief summary or the following detailed description. For the purposes of conciseness, many conventional techniques and principles related to the operation of conventional data capture devices, need not, and are not, described in detail herein.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. The term "exemplary" is used in the sense of "example, instance, or illustration" rather than "model," or "deserving imitation."

A mobile unit (MU) according to the invention includes components that are ergonomically arranged. For example, according to one embodiment, the mobile unit includes a handle configured for gripping the MU with fingers of one hand of a user's arm. A trigger switch is positioned on the handle and configured to activate a data capture function of the MU when the trigger switch is depressed. A display device is oriented substantially parallel to and above the handle of the MU such that the display device is viewable to the user when the fingers grip the handle of the MU and the user's arm is maximally extended. By substantially parallel, we mean that a plane of the display device can be oriented between zero and approximately thirty degrees relative to a long axis of the handle.

A data acquisition device is positioned on an opposite side of the display device so as to capture data from an object located in a field of view of the data acquisition device when the trigger switch is depressed.

The exemplary embodiments may be further understood with reference to the following description and the appended drawings, wherein like elements are referred to with the same reference numerals. The exemplary embodiments describe a MU that is designed such that when the user extends an arm with a hand holding the MU, the user is capable of viewing a display while activating the data capture function of the data acquisition device.

Figure 1:
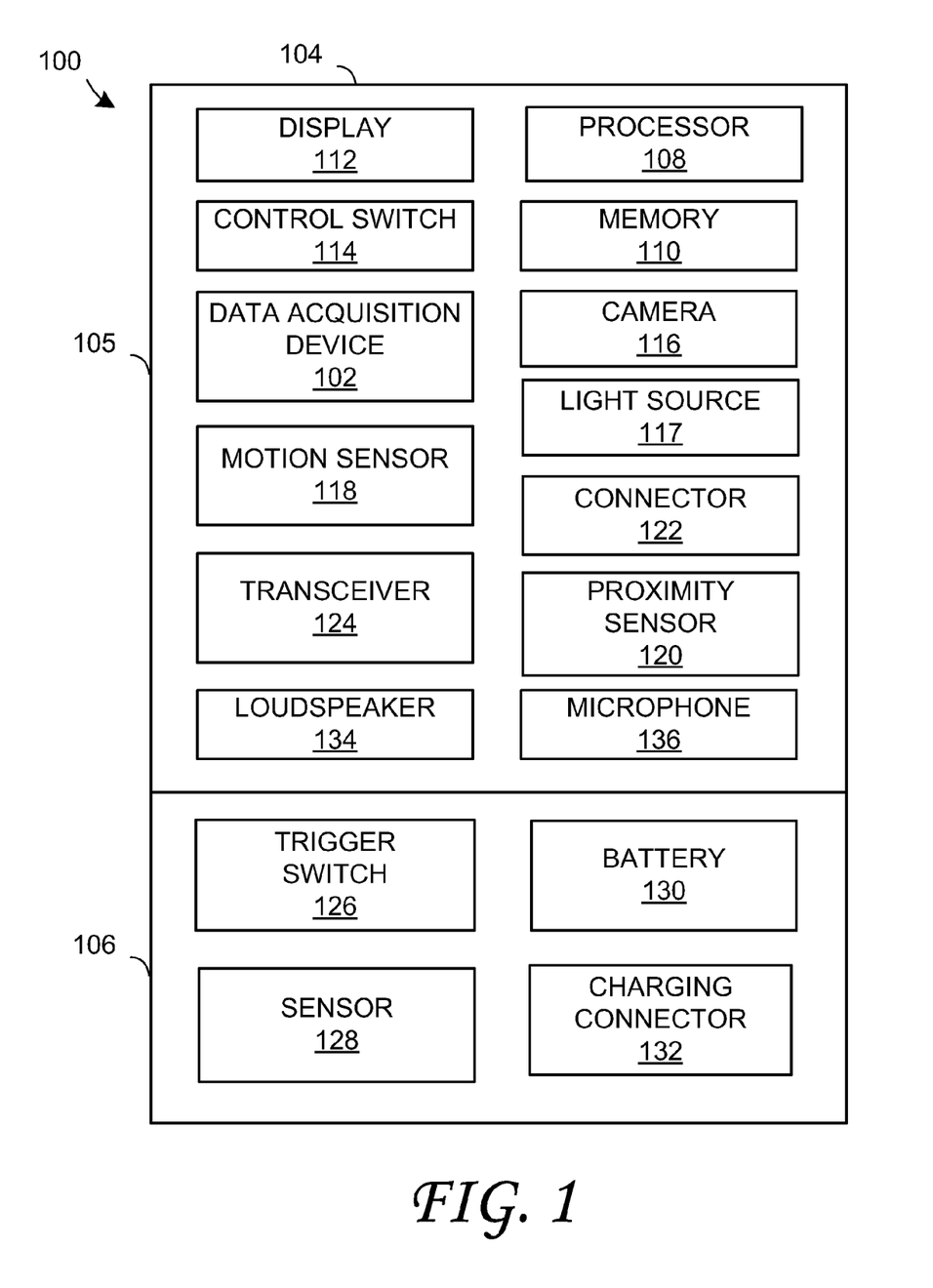
FIG. 1 illustrates a block diagram of components of a mobile unit including a data acquisition device according to one embodiment.

FIG. 1 illustrates a block diagram of components of a mobile unit (MU) 100 including a data acquisition device (DAD) 102 according to one embodiment of the invention. The MU 100 can be any portable device such as a barcode scanner, an imager, a mobile phone, a personal digital assistant, a smartphone, a tablet, a laptop, etc. In practice, the MU 100 can include any type of hand-held device that is capable of performing a data capture function. As illustrated in FIG. 1, the MU 100 can include the DAD 102, a housing 104 including a top portion 105 and a handle 106, a processor 108, a memory arrangement 110, a display device 112, a control switch 114, a camera 116, a light source 117, a motion sensor 118, a proximity sensor 120, a connector 122, a transceiver 124, a trigger switch 126, a sensor 128, a battery 130, a charging connector 132, a loudspeaker 134 and a microphone 136.

Figure 2:
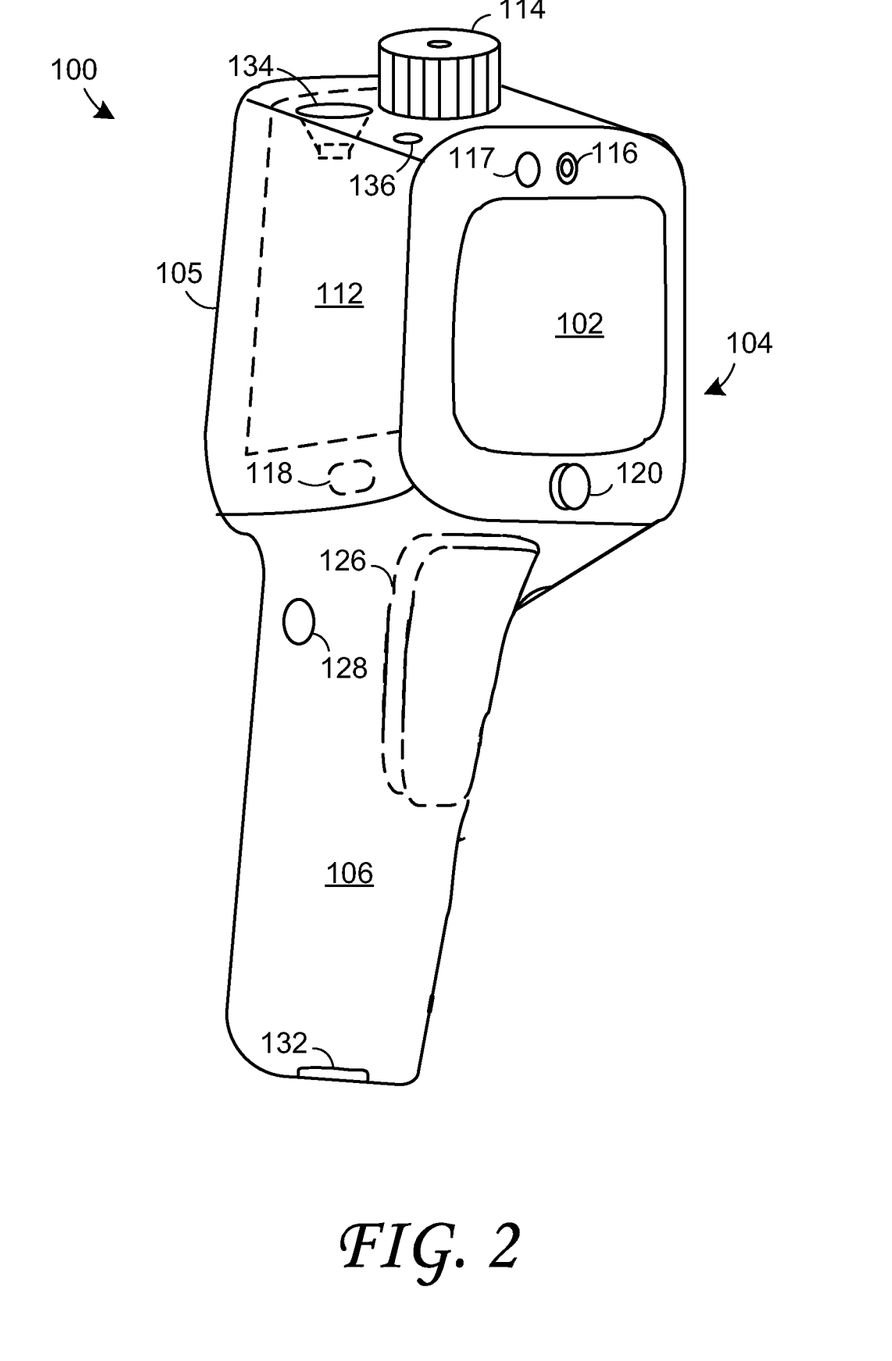
FIG. 2 illustrates a perspective view of the mobile unit of FIG. 1 according to one embodiment.

FIG. 2 illustrates a perspective view of the mobile unit 100 of FIG. 1 according to one embodiment. The components of the MU 100 illustrated in FIG. 2 include the housing 104, the display 112, the DAD 102, the control switch 114, the proximity sensor 120, the motion sensor 118, the camera 116, the light source 117, and the trigger switch 126. The MU 100 can also include the loudspeaker 134 and the microphone 136.

In one embodiment, the processor 108, the memory arrangement 110, the display device 112, the DAD 102, the control switch 114, the camera 116, the light source 117, the motion sensor 118, the proximity sensor 120, the connector 122 (FIG. 1), the transceiver 124 (FIG. 1), the loudspeaker 134, and the microphone 136 can be disposed at least partially within the top portion 105 of the housing 104. The trigger switch 126, the sensor 128, the battery 130 (FIG. 1), and the charging connector 132 can be disposed at least partially within the handle 106.

In one embodiment, the handle 106 extends from the top portion 105 of the housing 104 such that the user can grip and hold the MU 100 by the handle 106. Specifically, the user can hold the MU 100 by placing a palm of the hand against a side of the handle 106 and rolling the fingers of the hand around the handle 106. The handle 106 can be in the shape of a pistol grip. The handle 106 can be supported by a holster (not shown) to enable a hands-free operation of the MU 100. The holster may be attached to, for example, a belt, a lanyard, a strap, an article of clothing (e.g., a vest of a user), etc.

The housing 104, including the top portion 105 and the handle 106, can be fabricated from any suitable material, such as plastic, fibreglass, metal, etc. In alternate embodiments, the components of the MU 100 can be disposed within the housing 104, disposed partially within the housing 104, or disposed on an exterior surface of the housing 104. It should also be noted that the MU 100 can be fabricated by forming the housing 104 from a single piece of material. Alternatively, the housing 104 can be formed from several pieces of material, such as a front section and a back section.

The trigger switch 126 can be disposed at least partially within the handle 106 such that one of the fingers (e.g., an index finger) is capable of accessing the trigger switch 126 when the user holds the MU 100 by the handle 106. The trigger switch 126 can be a spring-loaded switch that is depressed by the user to activate the DAD 102 which performs the data capture function. The trigger switch 126 can be a momentary switch (as described above) or a "toggle" switch (for continuous "on" or "off" operation). The trigger switch 126 can also be a bifurcated switch for controlling two or more functions of the MU 100. For example, the bifurcated switch can have a top switch that activates a first function (e.g., activating the DAD 102) and a bottom switch that activates a second function (e.g., activating the light source 116). However, it should be noted that the trigger switch 126 can be any suitable switch.

The processor 108 (FIG. 1) can provide conventional functionalities for the MU 100. For example, the MU 100 can include a plurality of applications that are executed on the processor 108 such as a data capture application that receives encoded data from the DAD 102 and decodes the encoded data. Thus, when the trigger switch 126 is depressed to activate the DAD 102, the data capture application can be initiated.

The memory arrangement 110 (FIG. 1) can also provide conventional functionalities for the MU 100. For example, the memory arrangement 110 can store the data capture application as well as the encoded and decoded data from the data capture application. The display device 112 can be any component configured to display data to a user. For example, the display device 112 can be a liquid crystal display (LCD) sized to conform to the dimensions of the MU 100. The MU 100 can also include an input/output (I/O) device (not shown) that can be any component configured to receive an input from the user. For example, the I/O device can be a keypad (e.g., alphanumeric keypad, numeric keypad, etc.). The I/O device can also be a touch sensing pad for a user to enter inputs manually with a finger(s) or a stylus. It should be noted that the display device 112 can incorporate the I/O device, particularly when the I/O device is a touch panel including an area in which the user can input data.

The DAD 102 can be any device configured to obtain data such as product information from an object. For example, the DAD 102 can be a barcode scanner (e.g., for 1-dimensional barcodes, for 2-dimensional barcodes, etc.), an imager, a camera, a radio frequency identification (RFID) module, or any other suitable device, or combination of devices that can acquire product data from an object. For example, the barcode scanner can utilize a scanning engine that transmits and receives a laser to perform a laser scanning function. In another example, the imager or the camera may capture an image of a target area. It should be noted that the camera can be incorporated with the MU 100 to provide visual data to the user while the DAD 102 can be activated to perform the data capture function.

In one specific exemplary embodiment of the present invention, the camera 116 can be positioned adjacent to the DAD 102 such that a field of view of the camera 116 at least partially overlaps the field of the view of the DAD 102. When the field of view of the camera 116 is displayed to the user on the display 112, the user can properly align the DAD 102 to capture data from the desired target. In yet another example, an RFID module (not shown) can receive encoded data from an RFID tag. As will be described in further detail below, the display device 112 and the DAD 102 can be oriented with respect to the handle 106 such that fatigue from performing repeated scanning procedures is reduced and an efficiency of performing the repeated scanning procedures is increased.

The control switch 114 can be a conventional component that allows the user to control a parameter of the MU 100. For example, the control switch 114 can be a rotary control switch disposed at least partially within the housing 104 and accessible to the user. Accordingly, the user can rotate the rotary control switch to control a volume of sound that is output from the loudspeaker 134. The light source 117 can be a conventional component that provides illumination for the DAD 102. For example, when the data capture function is initiated, the light source 117 can illuminate an area containing the desired object.

The motion sensor 118 can be configured to determine a relative movement of the MU 100. For example, the motion sensor 118 can be an accelerometer that detects whether the MU 100 is stationary or in motion.

The proximity sensor 120 can be configured to determine a distance from the MU 100 to a target location. For example, the proximity sensor 120 can be a laser-based device that transmits a laser beam to a target and receives a return signal (i.e., reflection) that can be used to gauge a distance to the target. In practice, any suitable proximity sensor can be used. It should be noted that the MU 100 can include other types of sensors to provide data related to capturing data. For example, the MU 100 can include an ambient light sensor (not shown) that provides ambient light data to the processor 108 so that the processor 108 can determine whether to activate the light source 117.

The connector 122 (FIG. 1) can be any component configured to establish a connection with another component. For example, the connector 122 can be a charging connector or a data connector. In one embodiment, the connector can route power and data, such as a universal serial bus (USB) connector. Accordingly, the connector 122 (FIG. 1) can be disposed at least partially within the housing 104 while allowing access to a corresponding connector of a remote device.

The transceiver 124 (FIG. 1) can be any component configured to transmit and/or receive data. The transceiver 124 can therefore enable communication between the mobile device 100 and other electronic devices directly or indirectly through a network. For example, the transceiver 124 can transmit data captured by the DAD 102 to a remote server through a network.

The MU 100 can also include the loudspeaker 134. The loudspeaker 134 can output audio signals to the user. The microphone 136 can be any suitable audio receiving component. The user can provide audio commands or inputs to the MU 100 via the microphone 136.

In one embodiment, the sensor 128 can determine when the MU 100 is positioned in a holster. For example, the sensor 128 can include a magnetic switch that is activated by a corresponding magnet located in the holster. The sensor 128 can generate a sensor signal that indicates to the processor 108 that the MU 100 is situated in a hands-free presentation mode of operation.

Alternatively, the sensor 128 can include a light sensor that is sensitive to ambient light. A user gripping the handle 106 can cover the sensor 128 with the palm of the gripping hand. The sensor 128 can generate a sensor signal that indicates to the processor 108 (FIG. 1) that the MU 100 is situated in a hand-held mode of operation. For example, the sensor 128 can be disposed on the handle 106 and indicates when the user is holding the MU 100. Thus, when the sensor 128 determines that the hand of the user is holding the handle 106 of the MU 100, the processor 108 can initiate specific functions of the MU 100 or a particular application such as a data capture application.

The battery 130 (FIG. 1) can be any conventional portable power source. According to one embodiment, the battery 130 can be disposed within a recess in the handle 106. The charging connector 132 can be disposed adjacent to the battery 130. The charging connector 132 can couple the battery 130 to an external power supply such that the battery 130 may be recharged. For example, the external power supply can be integrated with a cradle (not shown) for receiving the MU 100.

According to exemplary embodiments, the display device 112 and the DAD 102 of the MU 100 can be oriented relative to the handle 106 to create an ergonomic design for the MU 100. For example, the handle 106 extends below the top portion 105 of the housing 106. The display device 112 can be disposed at least partially within the top portion 105 of the housing 106 and oriented such that a viewable surface is disposed substantially flush with a side of the top portion 105 of the housing 106. The handle 106 and the display device 112 can be oriented such that the display device 112 is disposed at an angle between one degree and thirty degrees relative to a long axis of the handle 106. In one embodiment, the display device 112 is disposed at an angle of ten degrees relative to the long axis of the handle 106. In practice, the display device 112 is positioned above the handle 106 of the MU 100 such that the display device 112 is viewable to the user when the fingers grip the handle 106 of the MU 100 and the user's arm is maximally extended.

According to exemplary embodiments of the present invention, with the user maximally extending the arm of the hand that holds the MU 100 by the handle 106 and the user being able to view data shown on the display device 112, the user may further activate the DAD 102 by depressing the trigger switch 126 with a finger of the hand to perform the data capture function. Accordingly, the DAD 102 can be located on an opposite side of the display device 112 (as shown in FIG. 2). The DAD 102 can be oriented within the top portion 105 of the housing 106 such that when the data capture function is activated, the DAD 102 is capable of capturing data (e.g., product information) from an object (e.g., a barcode symbol) located in a field of view of the DAD 102.

In a specific exemplary embodiment, the DAD 102 can be an imager or barcode scanner having a field of view that is oriented at angle with respect to the handle 106. The angular orientation can allow a user holding the MU 100 to naturally aim the MU 100 such that the DAD 102 captures data from an object located in front of the user. Accordingly, the user can hold the MU 100 with the arm maximally extended while maintaining a view of data displayed on the display device 112 and activating the DAD 102 to capture data from an object that is located in the field of view of the DAD 102.

Figure 3:
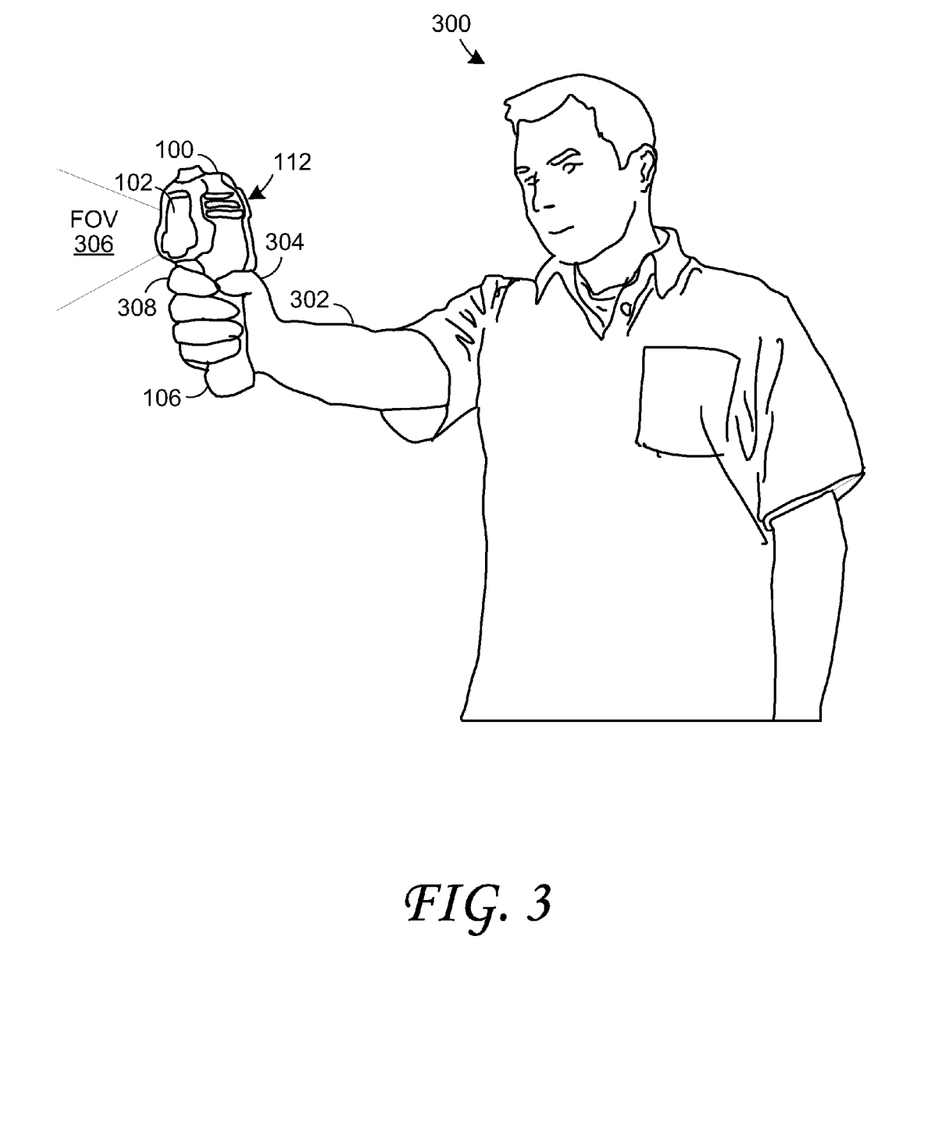
FIG. 3 illustrates a first perspective view of a user utilizing the mobile unit of FIG. 1 to activate a data capture function according to one embodiment.
Figure 4:
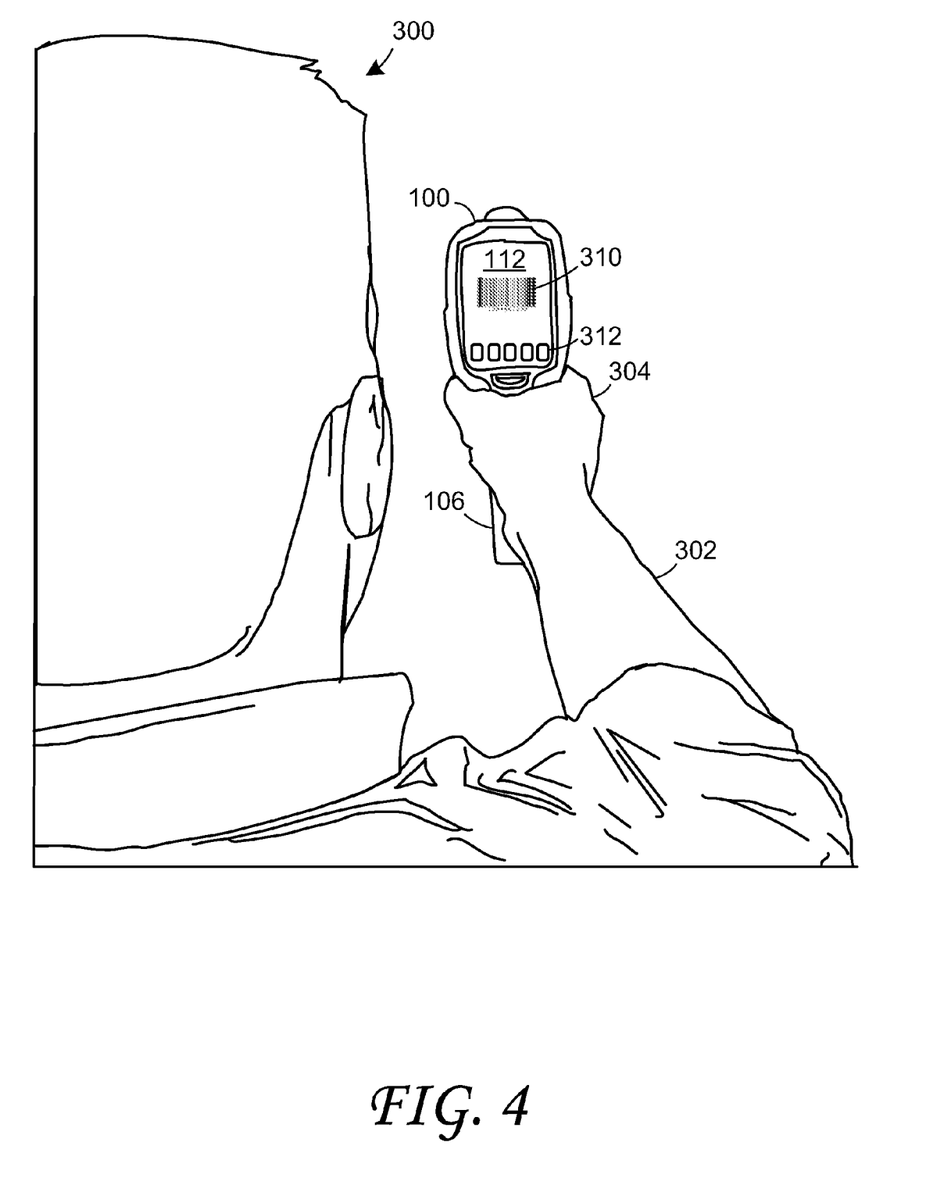
FIG. 4 illustrates a second perspective view of a user utilizing the mobile unit of FIG. 1 to activate a data capture function according to one embodiment.

FIG. 3 illustrates a first perspective view of a user 300 utilizing the mobile unit 100 of FIG. 1 to activate a data capture function according to one embodiment of the invention. FIG. 4 illustrates a second perspective view of the user 300 utilizing the mobile unit 100 of FIG. 1 to activate a data capture function according to one embodiment of the invention.

As previously described, the user 300 can maximally extend an arm 302 while holding the MU 100 with a hand 304. The MU 100 is oriented such that the field of view 306 of the DAD 102 is in front of the user 300. The user 300 can depress the trigger switch 126 (FIG. 1) with a finger 308 of the hand 304 while gripping the handle 106 of the MU 100. In one embodiment, depressing the trigger switch 126 (FIG. 2) activates the DAD 102. Furthermore, when the arm 302 of the user 300 is maximally extended, the user 300 can view data, such as a barcode symbol 310 and/or icons 312 displayed on the display device 112 (FIG. 4). In one embodiment, a central axis of the field of view 306 of the DAD 102 is substantially parallel to a longitudinal axis of the maximally extended arm 302 of the user 300.

Figure 5:
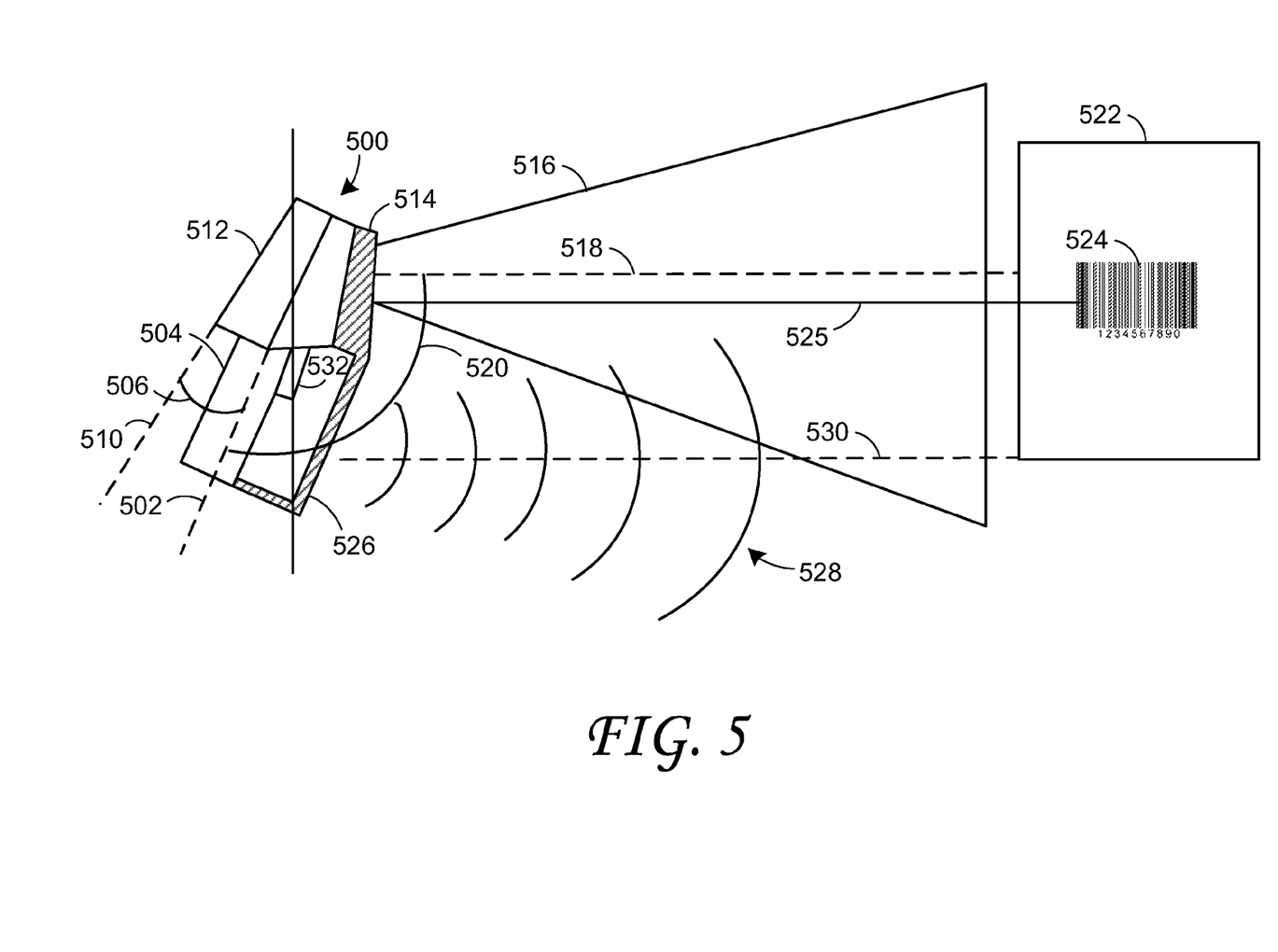
FIG. 5 illustrates a side view of a mobile unit according to one embodiment of the invention.

FIG. 5 illustrates a side view of a mobile unit (MU) 500 according to one embodiment of the invention. A user can grip the MU 500 such that a longitudinal axis 502 of a handle 504 of the MU 500 is oriented at an angle 506 with respect to a plane 510 of a display device 512. The angle 506 can be between zero degrees and approximately thirty degrees. In one embodiment, the preferred angle 506 is about ten degrees. The orientation of the components of the MU 500 allows data shown on the display device 512 to be viewed by a user holding the MU 500. Furthermore, as shown in FIG. 5, the DAD 514 can be an imager having a field of view 516 having a central axis 518 that is oriented at an angle 520 relative to the longitudinal axis 502 of the handle 504. The angle 520 can be between ninety degrees and approximately one-hundred and thirty-five degrees. In one embodiment, the preferred angle 520 is about one-hundred and twelve degrees.

In one embodiment, the DAD 514 can also include a laser scanner that is activated to perform the data capture function on an object 522 including, for example, scanning a barcode symbol 524 with a laser beam 525. The laser beam 525 can propagate in a direction that is substantially parallel to the central axis 518.

It should be noted that optional sensors such as a proximity sensor 120 (FIG. 1) can be disposed on the MU 500 to provide proximity data to a data capture application executing on a processor of the MU 500. In one embodiment, the proximity sensor 120 can be oriented to align with the central axis 518 of the DAD 514 such that a laser or signal transmitted from the proximity sensor 120 can propagate in a direction that is substantially parallel to the central axis 518 of the field of view 516 of the DAD 514. In one embodiment, the DAD 514 includes an RFID module 526 having a field of view 528 with a central axis 530 that is substantially parallel to the central axis 518.

The exemplary embodiments of the present invention provide a MU including ergonomic features to reduce fatigue from repeated scanning procedures being performed. The display device 512 of the MU 500 can be oriented such that it is angled at about ten degrees relative to a longitudinal axis 502 of the handle 504 of the MU 500. In this manner, information shown on the display device 512 can be viewed by the user holding the MU 500 when the arm of the user is maximally extended. Furthermore, the DAD 514 can be located on an opposite side of the display device 512 such that data from an object is captured (e.g., product information) within a field of view of the DAD 514 when a trigger switch 532 of the MU 500 is depressed.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and apparatus described herein. The non-processor circuits may include, but are not limited to, a radio receiver, a radio transmitter, signal drivers, clock circuits, power source circuits, and user input devices. As such, these functions may be interpreted as steps of a method described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In addition, the section headings included herein are intended to facilitate a review but are not intended to limit the scope of the present invention. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts or steps is intended to be required unless specifically indicated.

What is claimed is:

1. A mobile unit (MU), comprising:
a top portion;
a handle extending from the top portion, the handle configured for gripping the MU with fingers of one hand of a user's arm;
a trigger switch positioned on the handle and configured to activate a data capture function of the MU when the trigger switch is depressed;
a display device mounted on the top portion, the display device positioned above the handle of the MU and configured to be substantially flush with sides of the top portion for viewing display data such that the display data is viewable to the user when the fingers grip the handle of the MU and the user's arm is maximally extended, the display device having a display plane at an acute angle relative to a longitudinal axis of the handle; and
a data acquisition device located on an opposite side of the top portion from the display device so as to capture object data from an object positioned in a field of view of the data acquisition device when the trigger switch is depressed, the data acquisition device having a field of view with a central axis at an obtuse angle relative to the longitudinal axis of the handle.

2. The mobile unit of claim 1, wherein the data acquisition device comprises an imaging device.

3. The mobile unit of claim 2, wherein the display device is configured to display images from the imaging device.

4. The mobile unit of claim 1, wherein the data acquisition device comprises a laser scanning device.

5. The mobile unit of claim 1, wherein the data acquisition device comprises a radio-frequency identification (RFID) module.

6. The mobile unit of claim 1, further comprising a camera positioned adjacent to the data acquisition device such that a field of view of the camera at least partially overlaps the field of view of the data acquisition device.

7. The mobile unit of claim 1, further comprising a holster sensor configured to determine when the mobile unit is in a holster for controlling the display device and the data acquisition device.

8. The mobile unit of claim 1, wherein the trigger switch is accessible to an index finger of the hand of the user when the handle is held in the hand of the user.

9. The mobile unit of claim 1, further comprising a battery positioned in a recess of the handle.

10. The mobile unit of claim 1, further comprising a rotary control switch disposed on the top portion, the rotary control switch for controlling a function of the mobile unit.

11. The mobile unit of claim 1 wherein the obtuse angle is up to about one hundred and thirty-five degrees.

12. The mobile unit of claim 1 wherein the acute angle is less than about thirty degrees.

13. The mobile unit of claim 1 wherein the acute angle is about ten degrees.

14. A housing of a mobile unit (MU), comprising:
a handle configured for gripping the mobile unit with fingers of one hand of a user's arm, a trigger switch positioned on the handle and configured to activate a data capture function of the mobile unit when the trigger switch is depressed; and
a top portion coupled to the handle for housing a display device and a data acquisition device, the display device disposed above the handle of the mobile unit and configured to be substantially flush with sides of the top portion for viewing display data such that the display data is viewable to the user when the fingers grip the handle of the mobile unit and the user's arm is maximally extended, the display device having a display plane at an acute angle relative to a longitudinal axis of the handle; and the data acquisition device disposed on an opposite side of the housing from a side including the display device so as to capture object data from an object positioned in a field of view of the data acquisition device when the trigger switch is depressed, the data acquisition device having a field of view with a central axis at an obtuse angle relative to the longitudinal axis of the handle.

15. The housing of claim 14, wherein the top portion further comprises a proximity sensor for sensing proximity of an object in the field of view relative to the housing.

16. The housing of claim 14, wherein the top portion further comprises a motion sensor for sensing a motion of the housing.

17. The housing of claim 14, wherein the top portion at least partially houses a light source configured to generate illumination on the object.

18. The housing of claim 14, wherein the top portion at least partially houses a camera positioned adjacent the data acquisition device such that a field of view of the camera at least partially overlaps the field of view of the data capture device.

19. The housing of claim 14, wherein the top portion at least partially houses a rotary control switch for controlling a function of the mobile unit.

20. A mobile unit (MU), comprising:
a housing comprising a handle for gripping the mobile unit with fingers of one hand of a user's arm;
a trigger switch positioned on the handle for activating a data capture function of the mobile unit when the trigger switch is depressed, the trigger switch being accessible to an index finger of the hand of the user when the handle is held in the hand of the user;
a display device disposed at least partially within the housing and above the handle of the mobile unit and configured to be substantially flush with sides of the top portion for viewing display data such that the display data is viewable to the user when the fingers grip the handle of the device and the user's arm is maximally extended, the display device having a display plane at an acute angle relative to a longitudinal axis of the handle;
an imaging device coupled to the housing and located on an opposite side of the mobile unit from a side housing the display device so as to capture object data from an object positioned in a field of view of the imaging device when the trigger switch is depressed, the data acquisition device having a field of view with a central axis at an obtuse angle relative to the longitudinal axis of the handle; and
a camera coupled to the housing and located adjacent to the imaging device such that a field of view of the camera at least partially overlaps the field of view of the imaging device.

* * * * *